United States Patent
Lehuede et al.

(10) Patent No.: US 12,304,859 B2
(45) Date of Patent: May 20, 2025

(54) COPPER ALUMINOBOROSILICATE GLASS AND USES THEREOF

(71) Applicant: Eurokera, Jouarre (FR)

(72) Inventors: Philippe Lehuede, Dammarie-les-Lys (FR); Marie Comte, Fontenay aux Roses (FR)

(73) Assignee: CORNING INCORPORATED, Corning, NY (US)

( * ) Notice: Subject to any disclaimer, the term of this patent is extended or adjusted under 35 U.S.C. 154(b) by 1010 days.

(21) Appl. No.: 17/414,183

(22) PCT Filed: Dec. 17, 2019

(86) PCT No.: PCT/EP2019/085579
§ 371 (c)(1),
(2) Date: Jun. 15, 2021

(87) PCT Pub. No.: WO2020/127213
PCT Pub. Date: Jun. 25, 2020

(65) Prior Publication Data
US 2022/0041492 A1     Feb. 10, 2022

(30) Foreign Application Priority Data
Dec. 20, 2018   (FR) ...................................... 1873528

(51) Int. Cl.
*C03C 3/093*     (2006.01)
*C03C 3/097*     (2006.01)

(52) U.S. Cl.
CPC ..................... *C03C 3/097* (2013.01)

(58) Field of Classification Search
CPC .................. C03C 8/00–04; C03C 4/02; C03C 3/076–093; C03C 3/97
See application file for complete search history.

(56) References Cited

U.S. PATENT DOCUMENTS 3,984,252 A * 10/1976 Kiefer ................ C03C 10/0054
                                                                428/80
5,070,045 A    12/1991 Comte et al.
(Continued)

FOREIGN PATENT DOCUMENTS

CN     1105343 A     7/1995
CN     1198728 A     11/1998
(Continued)

OTHER PUBLICATIONS

Search Report and Written Opinion pertaining to Application No. PCT/EP2019/085579 dated Mar. 25, 2020.

*Primary Examiner* — Matthew E. Hoban
(74) *Attorney, Agent, or Firm* — Svetlana Z. Short

(57) ABSTRACT

The present invention provides an aluminoborosilicate glass of composition, expressed as percentages by weight of oxides, containing: 60% to 70% of $SiO_2$, 13% to 20% of $Al_2O_3$, 1% to 9% of $B_2O_3$, 0 to 3% of $P_2O_5$, 0.5% to 4% of MgO, 1% to 4% of BaO, 0 to 3% of CaO, 0 to 3% of SrO, 2% to 10% of ZnO, 0 to 2% of $Li_2O$, 0 to 2% of $Na_2O$, 0 to 2% of $K_2O$, 0.1% to 3% of CuO, optionally up to 1% of at least one fining agent; and optionally up to 2% of at least one coloring agent other than CuO, with MgO+BaO+CaO+SrO<6%, 0.2%<$Li_2O$+$Na_2O$+$K_2O$<2%, and $B_2O_3$+MgO+$Li_2O$—(BaO+CaO+SrO+CuO)<6.4%. The invention also provides an article constituted at least in part of an aluminoborosilicate glass, the article being selected from glazing and a cooktop for associating with induction heater means with infrared sensors.

16 Claims, 2 Drawing Sheets

(56) References Cited

U.S. PATENT DOCUMENTS

Figure 1:
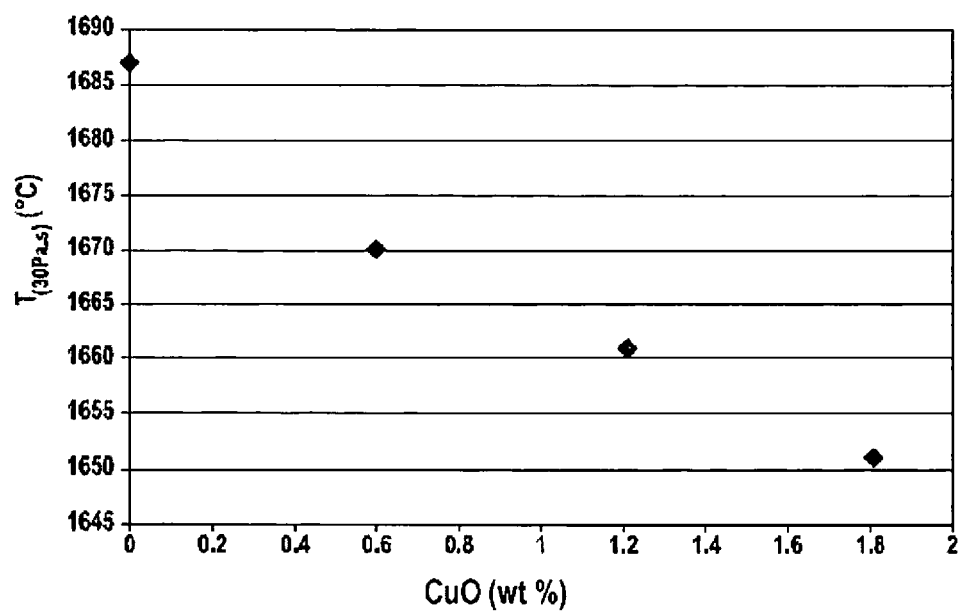

| | | | |
|---|---|---|---|
| 5,851,939 A | 12/1998 | Miwa | |
| 5,932,501 A | 8/1999 | Brocheton | |
| 6,391,809 B1* | 5/2002 | Young | H01J 5/04 501/15 |
| 6,586,087 B2 | 7/2003 | Young | |
| 7,671,303 B2 | 3/2010 | Vilato et al. | |
| 2013/0098903 A1 | 4/2013 | Di et al. | |
| 2015/0368149 A1 | 12/2015 | Guo et al. | |
| 2016/0174301 A1 | 6/2016 | Comte et al. | |
| 2018/0022634 A1* | 1/2018 | Inoue | B23K 26/0006 216/55 |
| 2018/0340262 A1 | 11/2018 | Hiranuma | |

FOREIGN PATENT DOCUMENTS

| | | |
|---|---|---|
| CN | 1759072 A | 4/2006 |
| CN | 1915877 A | 2/2007 |
| CN | 101437769 A | 5/2009 |
| CN | 102211869 A | 10/2011 |
| CN | 103003211 A | 3/2013 |
| CN | 103288346 A | 9/2013 |
| CN | 107250073 A | 10/2017 |
| CN | 107531540 A | 1/2018 |
| CN | 107922254 A | 4/2018 |
| FR | 3008695 A1 | 1/2015 |
| GB | 2079119 A | 1/1982 |
| JP | 2018048057 A | 3/2018 |
| RU | 2306277 C1 | 9/2007 |
| WO | 95/13993 A1 | 5/1995 |
| WO | 97/14661 A1 | 4/1997 |
| WO | 0027768 A1 | 5/2000 |
| WO | 2005/084756 A1 | 9/2005 |
| WO | 2012/010278 A1 | 1/2012 |
| WO | 2012156444 A1 | 11/2012 |
| WO | 2014/120641 A2 | 8/2014 |
| WO | 2015009483 A1 | 1/2015 |
| WO | 2016/182054 A1 | 11/2016 |
| WO | 2017217496 A1 | 12/2017 |

\* cited by examiner

COPPER ALUMINOBOROSILICATE GLASS AND USES THEREOF

CROSS-REFERENCE TO RELATED APPLICATIONS

This application claims the benefit of priority under 35 U.S.C § 365 of International Patent Application Serial No. PCT/EP2019/085579 filed on Dec. 17, 2019 designating the United States of America, the content of which is relied upon and incorporated herein by reference in its entirety, which in turn claims the benefit of priority under 35 U.S.C. § 119 of French Patent Application Serial No. 1873528 filed on Dec. 20, 2018, the content of which is relied upon and incorporated herein by reference in its entirety.

The present application relates to aluminoborosilicate glass. More precisely, the invention relates to aluminoborosilicate glass of composition containing copper and little or no lithium.

Such aluminoborosilicate glass is particularly suitable for use as a substrate for cooktops for associating with induction heater means; where said induction heater means now include a new generation of induction coils with infrared sensors. This type of induction heater has appeared recently. Said infrared sensors serve to control the temperature of the cooktop better so that it does not exceed 300° C. Requirements concerning values for the coefficient of thermal expansion (CTE) of the material constituting such cooktops are clearly much less severe than the corresponding requirements for cooktops used with radiant heating (where such cooktops might be raised to temperatures as high as 725° C.), and they are less severe than the requirements for cooktops used with conventional induction heating (such cooktops being subjected to temperatures that reach 450° C. only exceptionally, generally having a maximum of 400° C.).

The aluminoborosilicate glass of the present application has thus been developed in this specific context of cooktops for associating with induction heater means; where said induction heater means include induction coils with infrared sensors. Nevertheless, the use of such glass is not in any way limited to said context.

For many years, cooktops associated with heater means—radiant heating or induction heating, which may be conventional or with infrared sensors—have been mainly glass ceramic cooktops. The Applicant sells three types:

- cooktops made of glass ceramic (of the lithium aluminosilicate type containing a solid solution of β-quartz as the main crystal phase), of dark color, black, bulk colored; their coloring being the result of thermal treatment. Such cooktops are described in particular in U.S. Pat. No. 5,070,045 and patent application WO 2012/156444;
- cooktops made of glass ceramic (of the lithium aluminosilicate type containing a solid solution of β-spodumene as the main crystal phase), of white or dark grey color, semi-opaque. Such cooktops are described in particular in U.S. Pat. No. 7,671,303-B2; and
- cooktops made of glass ceramic (of the lithium aluminosilicate type containing a solid solution of β-quartz as the main crystal phase), of pale color, transparent, including a layer of colored decoration on their bottom faces (for placing facing the heater means, for the purpose of hiding such heater means) and used for induction cooking.

In general manner, there are far more cooktops of the first of the above type to found on the market, whether sold by the Applicant or by other suppliers.

In order to fabricate cooktops made of glass ceramic, a method is used that conventionally comprises the following three steps:

- melting a charge of vitrifiable raw materials, followed by fining the resulting molten glass;
- cooling the resulting fined molten glass and simultaneously shaping it; and
- applying ceramizing thermal treatment to said shaped glass.

It is clear that it would be advantageous to omit the ceramizing thermal treatment of the shaped glass while still having glass cooktops that present suitable properties. The prior art has thus already described glass cooktops of better or poorer performance and of greater or lesser ease of fabrication.

Patent application WO 00/27768 describes aluminoborosilicate glass having a CTE value $<20 \times 10^{-7}/°$ C., from 20 to 500° C. However, these materials are intended for telecommunications devices, such an application being different from the ones described in the present application. Furthermore, the compositions of such glass contain high quantities of copper ($Cu_2O$) and the glass compositions given in the examples contain neither alkali metals nor alkaline earth metals.

U.S. Pat. No. 6,586,087 also describes aluminoborosilicate glass of compositions containing copper. Such glass is proposed for sealing purposes. The compositions given are very broad. The example compositions are not compositions of the same type as those described in the present application: they contain little alumina and a large amount of boron oxide. The corresponding glass presents values of CTE from 25° C. to 500° C. that are greater than $34=10^{-7}/°$ C. Thus, not only does that document describe applications (sealing) that are totally different from those of the present invention (cooktops), and thus not forming part of the same technical field, but also those values for CTE are too high for the glass to be usable for making cooktops.

Since 1982, cooktops made of glass having a low coefficient of thermal expansion (CTE) for associating with induction heater means have been described in patent application GB 2 079 119. That document does not give any information about the properties of the glass in question. Nevertheless, it can be understood that the compositions contain a priori relatively low (<60%) or relatively high (>70%) contents of $SiO_2$ and do not contain copper.

Patent application WO 2015/009483 describes aluminosilicate glass having compositions without alkali metals, without copper, and optionally containing boron. Such glass presents low CTE values ($\leq 30 \times 10^{-7}/°$ C. from 20° C. to 300° C.). Such glass is particularly proposed as a substrate for cooktops for associating with induction heater means. The fabrication of such glass raises certain difficulties insofar as it presents viscosity at high temperature that is great, a resistivity that is great and viscosity values at the liquidus that can also be very small. This makes it difficult to fabricate the glass and can have an impact on the production tools and devices such as a decrease in the furnace life time, the use of costly refractory materials and the apparition of defects on the glass cooktops produced by rolling.

In such a context, the Applicant is now proposing a novel aluminoborosilicate glass that makes fabricating cooktops (or other articles) out of this glass easier than fabricating cooktops (or other articles) out of glass made in accordance with patent application WO 2015/009483. It may be considered that said novel glass is of a composition that is optimized in particular with reference to a decrease in its values for high temperature viscosity and high temperature resistivity and an increase of the viscosity value at the liquidus.

Specifically, aluminoborosilicate glass of the present application combines:

easy implementation of the process for obtaining it, insofar as it presents viscosity of 30 pascal-seconds (Pa·s) (300 poises) at less than 1680° C., advantageously at less than 1660° C., viscosity at the liquidus temperature of more than 500 Pa·s (5000 poises), advantageously of more than 600 Pa·s (6000 poises), and electrical resistivity at 30 Pa·s of less than 100 ohm centimeters (Ω·cm), this low resistivity making the glass easier to melt when using electrically-assisted melting; said preparation process also being intrinsically advantageous compared with the method of preparing glass ceramics, in that it does not include a ceramizing step, nor quenching or hardening;

a composition 1) containing little or no lithium (at present, obtaining lithium is becoming more difficult than in the past. In any event, it is an element that is becoming more expensive. The explanation for recent pressure on the availability and the price of lithium lies in growing demand for lithium for making lithium batteries), and 2) making it possible to make a broad palette of colors available; and performance that is advantageous 1) in terms of thermal expansion (the glass presents a coefficient of thermal expansion (CTE) from 20° C. to 300° C. that is low: $\leq 30 \times 10^{-7}/°$ C.), and 2) in terms of resistance to acid attack (thus presenting resistance to acid attack (half weight loss per unit area), measured in accordance with the DIN 12-116 standard that is less than 250 milligrams per square decimeter ($mg/dm^2$), preferably less than 100 $mg/dm^2$).

Said aluminoborosilicate glass of the present application presents a composition, expressed in percentages by weight of oxides, that contain:

60% to 70% of $SiO_2$,
13% to 20% of $Al_2O_3$,
1% to 9% of $B_2O_3$,
0 to 3% of $P_2O_5$,
0.5% to 4% of MgO,
1% to 4% of BaO,
0 to 3% of CaO,
0 to 3% of SrO,
2% to 10% of ZnO,
0 to 2% of $Li_2O$,
0 to 2% of $Na_2O$,
0 to 2% of $K_2O$,
0.1% to 3% of CuO,
optionally up to 1% of at least one fining agent, in particular 0.1% to 1% of $SnO_2$; and
optionally up to 2% of at least one coloring agent other than CuO, with:

MgO+BaO+CaO+SrO≤6%, 0.2%≤$Li_2O$+$Na_2O$+$K_2O$≤2%, and $B_2O_3$+MgO+$Li_2O$—(BaO+CaO+SrO+CuO)<6.4%;

advantageously <6%.

The glass of the present application—aluminoborosilicate glass of composition containing little or no lithium and containing copper—presents in characteristic manner the composition by weight as given above and, in addition, contents of $B_2O_3$, alkaline earth metals, alkali metals, and CuO that need to satisfy the three conditions specified above.

The first (MgO+BaO+CaO+SrO≤6%) and the "second" ($Li_2O$+$Na_2O$+$K_2O$≤2%) of these three conditions ensure that a glass presenting the specified composition by weight has a low coefficient of thermal expansion (CTE): less than $30 \times 10^{-7}/°$ C. from 20° C. to 300° C. The inventors have shown that glasses presenting such CTE values are entirely suitable as a substrate for cooktops having a typical thickness in the range 3 millimeters (mm) to 6 mm, and in particular a thickness of 4 mm, said cooktops being entirely suitable for associating with induction heater means including infrared sensors. Said cooktops do not deform or break under chocks or 300° C. thermal gradients.

The "second" of these conditions, relating to the presence of alkali metals (0.2%≤$Li_2O$+$Na_2O$+$K_2O$) ensures low electrical resistivity at high temperature (electrical resistivity at 30 Pa·s of less than 100 Ω·cm).

The third of these three conditions ($B_2O_3$+MgO+$Li_2O$—(BaO+CaO+SrO+CuO)<6.4%; advantageously <6%) ensures that such a glass presenting the specified composition by weight has advantageous resistance to acid attack (half weight loss per unit area): less than 250 $mg/dm^2$, preferably less than 100 $mg/dm^2$. Resistance to acid attack is measured in accordance with the DIN 12-116 standard. The inventors have shown that such resistance to acid attack values are entirely compatible with using such glass as a substrate for cooktops.

The following can be specified concerning each of the components forming part of the above-specified composition (or potentially forming part thereof) at the specified contents (where the (high and low) extreme values for each of the specified ranges are included in said ranges).

$SiO_2$ (60%-70%): the content of $SiO_2$ is greater than or equal to 60% with reference to the looked-for good values of resistance to acid attack and low coefficient of thermal expansion (CTE). This content does not exceed 70%, with reference to the (high temperature) viscosity of the glass, and thus to advantageous conditions of obtaining the glass. The $SiO_2$ content of a glass of the present application advantageously lies in the range 62% to 67%.

$Al_2O_3$ (13%-20%): the content of $Al_2O_3$ is as specified with reference to advantageous conditions for obtaining (melting) the glass. Specifically, $Al_2O_3$ present at the specified content serves to obtain glass viscosity of 30 Pa·s (300 poises) at temperatures below 1680° C. A content greater than 20% reduces the viscosity at the liquidus, which can make forming the glass more complicated. The $Al_2O_3$ content advantageously lies in the range 14% to 17%.

$B_2O_3$ (1%-9%): a glass of the invention contains boron in its composition. Boron acts to lower the (high temperature) viscosity of the glass. When it is present at too great a quantity ($B_2O_3$>9%) the resistance to acid attack of the glass is degraded. The composition by weight of a glass of the invention advantageously contains 4% to 7% (and in particular 5% to 7%) of $B_2O_3$.

$P_2O_5$ (0-3%): $P_2O_5$ is not necessarily present. It is advantageously present with reference to the viscosity at the liquidus. To be effective, when present, it is generally present at at least 0.1%. When present in too great a quantity (>3%), it degrades the resistance to acid attack.

MgO (0.5%-4%): MgO is present at at least 0.5%. It is used for reducing the high temperature viscosity of the glass. It is not present in too great a quantity (MgO≤4%) since the resistance to acid attack of the glass is severely affected, and its CTE also increases greatly. The composition by weight of a glass of the invention advantageously contains 1% to 2% of MgO.

BaO (1%-4%), CaO (0-3%), and SrO (0-3%): these are present to obtain a sufficient resistance to acid attack. They allow in particular the avoidance of phase separation phenomena which have a great impact on this resistance. The presence of BaO has been found to be essential, in particular for resistance to acid attack. BaO is also useful for reducing the viscosity of the glass. BaO present in the range 1% to 4% is advantageously present in the range 1.5% to 3%. SrO may be present up to 3%. Glass compositions of the present application are nevertheless advantageously free from SrO (with the exception of inevitable traces: <1000 parts per million (ppm)). Traces of SrO may be the result of recycled raw materials in the charge. CaO may also be present (but it is not necessarily present) up to 3%. Advantageously, it is present only up to 1%.

ZnO (2%-10%): the compositions of a glass of the present application contain zinc (ZnO≤2%). This compound is used mainly for reducing the coefficient of thermal expansion (CTE). It is not used in excess (ZnO>10%) in order to avoid any devitrification. ZnO is advantageously present at contents in the range 5% to 7%.

$Li_2O$ (0-2%), $Na_2O$ (0-2%), and $K_2O$ (0-2%): these three alkali metal oxides, when present at some minimum quantity (at least 0.2%), ensure low high-temperature viscosity ($T_{(30Pa \cdot s)}$<1680° C.) and low high-temperature electrical resistivity (electrical resistivity at 30 Pa·s of less than 100 Ω·cm) (see above). When present in excessive quantity (more than 2%), they are responsible for a large increase in the CTE. With reference to $Li_2O$ content, a glass of the present application is particularly advantageous. It is capable of satisfying specifications in the absence of $Li_2O$ in its composition. The presence of low quantity of $Li_2O$ is however interesting because this element increases less the CTE and decreases more the high temperature viscosity of the glass than $Na_2O$ or $K_2O$. In any event, with reference to said specifications, it presents performance when containing no more than a maximum of 2% of $Li_2O$. In variants that are more or less advantageous, given the specifications and pressure on the availability and the price of lithium, the compositions of a glass of the present application contain 0 to 1% by weight of $Li_2O$ (0%≤$Li_2O$≤1%), 0.1% to 1% by weight of $Li_2O$ (0.1%≤$Li_2O$≤1%), 0.2% to 0.6% by weight of $Li_2O$ (0.2%≤$Li_2O$≤0.6%).

CuO (0.1%-3%): CuO is thus used essentially to reduce the high temperature viscosity of a glass of the present application (said glass presenting viscosity of 30 Pa·s (300 poises) at less than 1680° C.) while controlling the CTE of such a glass. When present at contents greater than 3%, crystals are observed to precipitate at the surface (during cooling after forming). CuO is thus advantageously present in small quantity. It is advantageously present at a content lying in the range 0.5% to 1.8% by weight (0.5%≤CuO≤1.8%) with reference thus to its beneficial effect on the high temperature viscosity and on chemical resistance to acid attack, but while taking account of its harmful effect on the CTE and on the risks of crystals precipitating at the surface. It may also be mentioned at this point that CuO develops a coloring action.

Fining agent(s): the composition of the glass advantageously contains at least one fining agent such as $As_2O_3$, $Sb_2O_3$, $SnO_2$, $CeO_2$, $MnO_2$, a chloride, a fluoride, or a mixture thereof. Said at least one fining agent is present at an effective quantity (for performing chemical fining), and conventionally does not exceed 1% by weight. It is generally present in the range 0.05% to 1% by weight.

In preferred manner, for environmental reasons, fining is obtained by using $SnO_2$, generally in the range 0.05% to 0.6% by weight of $SnO_2$, and more particularly in the range 0.15% to 0.4% by weight of $SnO_2$. Under such circumstances, the composition of a glass of the present application does contain neither $As_2O_3$ nor $Sb_2O_3$, nor does they contain more than inevitable traces of at least one of these toxic compounds ($As_2O_3$+$Sb_2O_3$<1000 ppm). If traces of at least one of these compounds are present, they are present as contamination; this may be due to the presence of recycled materials of the cullet type (derived from old glass fined with both compounds) in the charge of vitrifiable raw materials. Under such circumstances, the combined presence of at least one other fining agent, such as $CeO_2$, a chloride, and/or a fluoride is not excluded, but $SnO_2$ is preferably used as the only fining agent. It should be observed that the absence of an effective quantity of chemical fining agent(s), or indeed the absence of any chemical fining agent, is not totally to be excluded; the fining can then be performed thermally. This non-excluded variant is nevertheless not preferred in any way.

Figure 2:
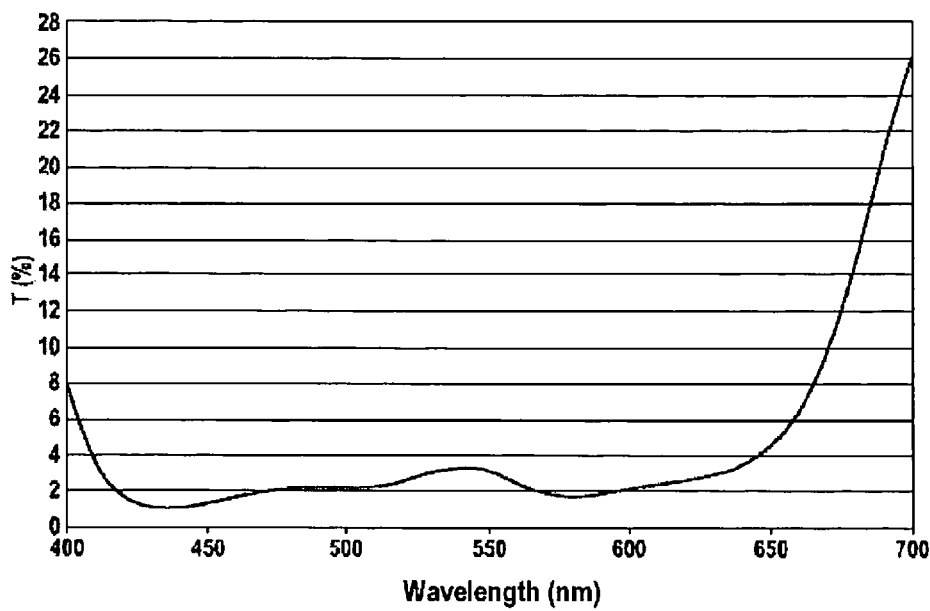

Coloring agent(s) other than CuO (optionally up to 2%): a glass of the present application is intrinsically (i.e. in the absence of any other added coloring agent) slightly colored due to the presence in its composition of CuO (a coloring agent). CuO develops pale green coloring. This pale coloring is made "darker" to a greater or lesser extent depending on the content of $Fe_2O_3$ (co-present as impurity (brought in with the raw materials)) and on the content of CuO. The composition of a glass of the invention advantageously contains at least one (added) coloring agent other than CuO, such that said glass is relatively dark (i.e. suitable for masking elements arranged under cooktops made of said glass). Said at least one (added) other coloring agent may be selected in conventional manner from the oxides of transition elements (NiO, CoO, $Cr_2O_3$, $Fe_2O_3$, $V_2O_5$, $MnO_2$, and mixtures thereof, in particular mixture of NiO, CoO and $Fe_2O_3$) and of rare earths ($Nd_2O_3$, $Er_2O_3$, and mixtures thereof). Said at least one (added) other coloring agent not including CuO is present at an effective quantity (generally at least 0.001%, better at least 0.05%), and conventionally up to a maximum of 2% or indeed up to a maximum of 1%. For a glass of the invention with one or more added coloring agents other than CuO in its composition, it is generally desired to have integrated transmission of less than 10% (Y %, see the examples below) for a product used at a thickness that generally lies in the range 3 mm to 6 mm, and in particular that is equal to 4 mm. In particular, the mixture of CuO, NiO, CoO, and $Fe_2O_3$ coloring agents are particularly interesting for obtaining glass having spectral transmission curves (T %) in the visible that are practically flat, as shown in FIG. 2 relating to Example 11. Thus with this glass, the colour shade emitted by the light-emitting diodes (LEDs) placed under it is not modified by the glass spectral luminous absorption. This can be most advantageous from an appearance point of view when it is desired to arrange lighting at a plurality of wavelengths under a glass cooktop.

The components included in or potentially included in the composition of a glass of the present application, as identified above ($SiO_2$, $Al_2O_3$, $B_2O_3$, $P_2O_5$, MgO, BaO, SrO, CaO, ZnO, $Li_2O$, $Na_2O$, $K_2O$, CuO, fining agent(s) and/or coloring agent(s)) and the inevitable impurities may perfectly well represent 100% by weight of the composition of the glass of the present application, but a priori it is not completely impossible for at least one other compound to be present in small quantity (generally less than or equal to 3% by weight), without having any substantial effect on the properties of the glass. The following compounds in particular may be present, at a total content that is less than or equal to 3% by weight, with each of them being present at a total content that is less than or equal to 2% by weight: $Nb_2O_5$, $Ta_2O_5$, $WO_3$, and $MoO_3$. It should be observed that the inevitable impurities should represent no more than 5000 ppm.

The components included in or potentially included in the composition of the glass of the present application, as identified above ($SiO_2$, $Al_2O_3$, $B_2O_3$, $P_2O_5$, MgO, BaO, SrO, CaO, ZnO, $Li_2O$, $Na_2O$, $K_2O$, CuO, fining agent(s) and coloring agent(s)) and the inevitable impurities thus represent at least 97% by weight, or even at least 98% by weight, or even at least 99% by weight, or even indeed 100% by weight (see above) of the composition of the glass of the present application.

A glass of the present application is particularly advantageous, as follows:
  with reference to the process of obtaining it; the process clearly does not include a ceramizing step and it is easy to perform insofar as such a glass presents:
    a viscosity of 30 Pa·s (300 poises) at less than 1680° C., advantageously at less than 1660° C.;
    a viscosity at the liquidus temperature of more than 500 Pa·s (5000 poises), advantageously of more than 600 Pa·s (6000 poises); and
    electrical resistivity at 30 Pa·s of less than 100 Ω·cm;
  in that the composition contains no or little $Li_2O$ and can easily be adjusted to obtain a desired transmission curve in the visible (making such a glass compatible with LEDs at different wavelengths); and
  with reference to its properties, that are particularly suitable for use as material constituting a cooktop associated with induction heater means with infrared sensors:
    a coefficient of thermal expansion (CTE) from 20° C. to 300° C. of less than $30 \times 10^{-7}$/° C. The glass can be used as a cooktop's substrate without quenching. Optionally, quenching of the glass can improve its thermomechanical properties such as the resistance to thermal shocks; and
    a resistance to acid attack (half weight loss per unit area), measured in accordance with the DIN 12-116 standard, of less than 250 mg/dm², preferably less than 100 mg/dm²).

In a second aspect, the present application provides articles made at least in part out of an aluminoborosilicate glass as described above, selected in particular from glazing and from a cooktop for a cooking appliance having induction heating with infrared sensors (=cooktops for associating with induction heater means with infrared sensors). The glass is advantageous for any application that needs to withstand large thermal shocks or that is subjected to large temperature gradients of 300° C. amplitude. In other words, the application also provides the use of an aluminoborosilicate glass as described above as a substrate for an element selected from glazing and from a cooktop for a cooking appliance having induction heating with infrared sensors (=cooktops for associating with induction heater means with infrared sensors).

Concerning the process for obtaining a glass (and an article) of the present application, it can be understood that it is not in itself original in any way. It is a conventional process for obtaining glass by melting the raw materials used (which melting is advantageously performed while minimizing volatilization of said raw materials in the range 1500° C.-1680° C.), said melting advantageously being followed by fining the resulting molten glass and then generally simultaneously cooling and forming said fined molten glass (forming to the shape desired for the looked-for article, and thus often the shape of a plate), and finally annealing in order to eliminate residual constraints.

The present application is illustrated below by the following examples and the accompanying figures.

More precisely, Examples 1 to 16 illustrate the present application while Examples A, B, and C are comparative examples.

Figure 3:
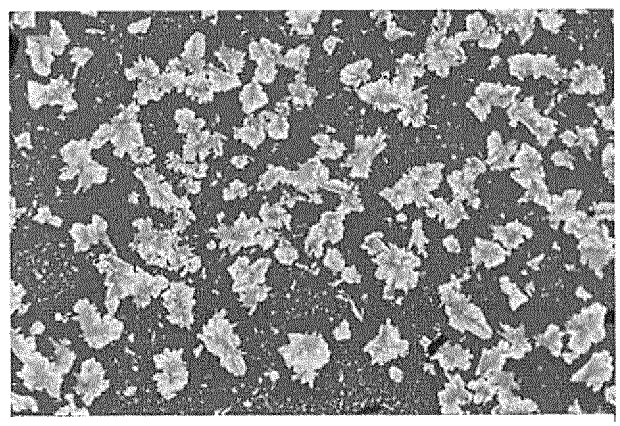
Figure 4:
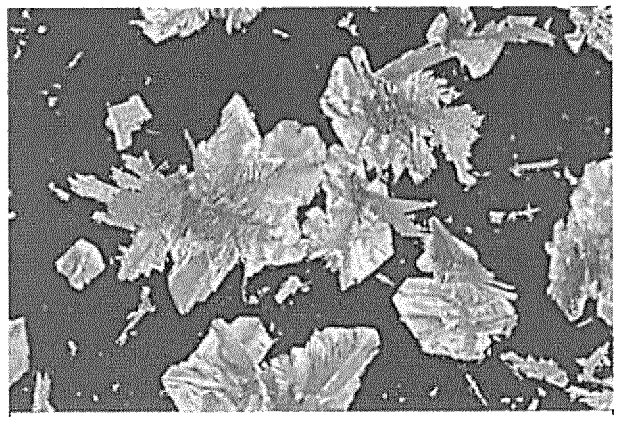

FIGS. 1 and 2 show respectively:
  for FIG. 1, the temperature (° C.) at which the viscosity of the glass was 30 Pa·s as a function of the content of CuO (% by weight) in its composition; and
  for FIG. 2, the curve for spectral transmission (T (%)) in the visible for a glass of the present application (the glass of Example 11);
  for FIGS. 3 and 4, scanning electron microscope (SEM) photographs showing precipitation of copper crystals at the surface with a glass composition having too great a content of CuO (Example C) (FIG. 3: magnification ×200-FIG. 4 magnification ×1000).

EXAMPLES process of preparation of glass: 1 kilogram (kg) batches of raw materials were prepared. The raw materials were mixed carefully in the proportions set out in the first portions of tables IA, IB, IC, ID, and II (which proportions are expressed as % by weight of oxides). For melting, the mixtures were placed in platinum crucibles. The crucibles containing said mixtures were then inserted into a furnace preheated to 1550° C. Therein they were subjected to the following melting cycle:
  maintain 1550° C. for 15 minutes;
  raise temperature from 1550° C. to 1670° C. over 30 minutes; and
  maintain 1670° C. for 390 minutes.

The crucibles were then extracted from the furnace and the molten glass was poured on a preheated steel plate. It was rolled on the plate to a thickness in the range 4 mm to 6 mm. Glass plates were thus obtained. They were annealed at 750° C. for 1 hour.

The results as obtained in that way on a laboratory scale are entirely transposable to an industrial scale.

Properties

The properties of the resulting glass are set out in the second portions of said Tables IA, IB, IC, ID, and II.

Viscosities were measured using a rotational viscosimeter (Thermo HAAKE VT550).

$T_{(30Pa \cdot s)}$ (° C.) corresponds to the temperature at which the viscosity of the glass was 30 Pa·s (=300 poises).

The resistivity of the glass was measured at high temperature on a thickness of 1 centimeter (cm) of molten glass, using an RLC probe with 4-point contact. The tables give the resistivity as measured at the temperature at which the viscosity was 30 Pa·s.

$T_{liq}$ (° C.) is the liquidus temperature. Specifically, the liquidus is given by a range of temperatures and associated viscosities: the highest temperature corresponds to the minimum temperature at which no crystal was observed, the lowest temperature corresponds to the maximum temperature at which crystals were observed.

The specified CTE is the coefficient of thermal expansion from 20° C. to 300° C.

The resistance to acid attack specified was measured in accordance with the DIN 12-116 standard.

Concerning the optical properties of the glass that was obtained, total and diffuse transmission measurements were performed on some of the prepared glass specimens at a thickness of 4 mm by using a Varian spectrophotometer (Cary 500 Scan), having an integrating sphere. From those measurements, the integrated transmission (Y or TL (%)) was calculated.

There follow said Tables IA, IB, IC, ID (Examples 1 to 16 of the present application) and II (comparative Examples A, B and C).

TABLE IA

| Composition (weight %) | Example 1 | Example 2 | Example 3 | Example 4 |
|---|---|---|---|---|
| $SiO_2$ | 66.852 | 66.664 | 66.283 | 66.872 |
| $Al_2O_3$ | 16.04 | 15.99 | 16.02 | 16.04 |
| $B_2O_3$ | 6.01 | 6 | 6.01 | 6.01 |
| MgO | 1.7 | 1.39 | 1.7 | 1.7 |
| ZnO | 6.02 | 6 | 6.01 | 5.4 |
| $SnO_2$ | 0.30 | 0.30 | 0.30 | 0.30 |
| BaO | 1.35 | 1.34 | 1.35 | 1.35 |
| $Li_2O$ | 0.50 | 0.50 | 0.50 | 0.50 |
| $Na_2O$ | | | | |
| CaO | | | | |
| $P_2O_5$ | | | | |
| CuO | 1.21 | 1.80 | 1.81 | 1.81 |
| $Fe_2O_3$ | 0.015 | 0.015 | 0.015 | 0.015 |
| CoO | | | | |
| NiO | | | | |
| $Cr_2O_3$ | | | | |
| MgO + BaO + CaO + SrO | 3.1 | 2.7 | 3.1 | 3.1 |
| $Li_2O + Na_2O + K_2O$ | 0.5 | 0.5 | 0.5 | 0.5 |
| $B_2O_3$ + MgO + $Li_2O$ − (BaO + CaO + SrO + CuO) | 5.7 | 4.8 | 5.1 | 5.1 |
| Properties | | | | |
| $T_{(30\ Pa\cdot s)}$ (° C.) | 1661 | 1664 | 1651 | 1661 |
| Resistivity at 30 Pa·s (Ω·cm) | 25.4 | 22.8 | 24.5 | 21.2 |
| $T_{liq}$ (° C.) | 1350-1372 | | 1350-1367 | |
| Viscosity at $T_{liq}$ (Pa·s) | 770-1060 | | 715-915 | |
| $CTE_{(20-300°\ C.)}$ (× $10^{-7}$/° C.) | 23 | 22 | 22.3 | 23.9 |
| Resistance to acid attack (1/2 weight loss − mg/dm$^2$) | | 87 | 80 | |
| Y (%) (4 mm thick) | | | | |

TABLE IB

| Composition (weight %) | Example 5 | Example 6 | Example 7 | Example 8 |
|---|---|---|---|---|
| $SiO_2$ | 64.941 | 64.590 | 63.604 | 63.075 |
| $Al_2O_3$ | 15.8 | 15.82 | 15.74 | 15.72 |
| $B_2O_3$ | 5.92 | 5.93 | 5.9 | 5.89 |
| MgO | 1.37 | 1.68 | 1.67 | 1.66 |
| ZnO | 5.93 | 5.94 | 5.91 | 5.9 |
| $SnO_2$ | 0.30 | 0.30 | 0.30 | 0.29 |
| BaO | 1.33 | 1.33 | 1.89 | 1.89 |
| $Li_2O$ | 0.50 | 0.50 | 0.49 | 0.49 |
| $Na_2O$ | | | | |
| CaO | | | | |
| $P_2O_5$ | 2.12 | 2.12 | 2.11 | 2.11 |
| CuO | 1.78 | 1.78 | 2.37 | 2.95 |
| $Fe_2O_3$ | 0.018 | 0.018 | 0.018 | 0.018 |
| CoO | | | | |
| NiO | | | | |
| $Cr_2O_3$ | | | | |
| MgO + BaO + CaO + SrO | 2.7 | 3.0 | 3.6 | 3.6 |
| $Li_2O + Na_2O + K_2O$ | 0.5 | 0.5 | 0.5 | 0.5 |
| $B_2O_3$ + MgO + $Li_2O$ − (BaO + CaO + SrO + CuO) | 4.7 | 5.0 | 3.8 | 3.2 |
| Properties | | | | |
| $T_{(30\ Pa\cdot s)}$ (° C.) | 1667 | 1659 | 1654 | 1643 |
| Resistivity at 30 Pa·s (Ω·cm) | 24.6 | 23.4 | 19.8 | 22 |
| $T_{liq}$ (° C.) | | 1320-1340 | <1335 | <1335 |
| Viscosity at $T_{liq}$ (Pa·s) | | 1100-1450 | >1050 | >900 |
| $CTE_{(20-300°\ C.)}$ (× $10^{-7}$/° C.) | 21.7 | 22.3 | 22.4 | 23.2 |
| Resistance to acid attack (1/2 weight loss − mg/dm$^2$) | 90 | 98 | 85.8 | 84.2 |
| Y (%) (4 mm thick) | | | 53.8 | 38.2 |

TABLE IC

| Composition (weight %) | Example 9 | Example 10 | Example 11 | Example 12 |
|---|---|---|---|---|
| $SiO_2$ | 63.089 | 62.954 | 63.631 | 64.281 |
| $Al_2O_3$ | 15.55 | 15.58 | 15.75 | 15.78 |
| $B_2O_3$ | 5.83 | 5.84 | 5.90 | 5.92 |
| MgO | 1.65 | 1.65 | 1.67 | 1.67 |
| ZnO | 5.84 | 5.84 | 5.91 | 5.92 |
| $SnO_2$ | 0.29 | 0.29 | 0.29 | 0.20 |
| BaO | 1.87 | 1.86 | 1.89 | 1.90 |
| $Li_2O$ | 0.49 | 0.49 | 0.49 | 0.25 |
| $Na_2O$ | | | | 0.51 |
| CaO | | | | 0.07 |
| $P_2O_5$ | 2.09 | 2.08 | 2.11 | 1.06 |
| CuO | 2.95 | 2.95 | 1.78 | 1.78 |
| $Fe_2O_3$ | 0.018 | 0.018 | 0.018 | 0.210 |
| CoO | 0.111 | | 0.223 | |
| NiO | 0.222 | | 0.333 | |
| $Cr_2O_3$ | | 0.451 | | 0.453 |
| MgO + BaO + CaO + SrO | 3.5 | 3.5 | 3.6 | 3.6 |
| $Li_2O + Na_2O + K_2O$ | 0.5 | 0.5 | 0.5 | 0.8 |
| $B_2O_3$ + MgO + $Li_2O$ − (BaO + CaO + SrO + CuO) | 3.1 | 3.2 | 4.4 | 4.1 |
| Properties | | | | |
| $T_{(30\ Pa\cdot s)}$ (° C.) | 1632 | | 1656 | 1648 |
| Resistivity at 30 Pa·s (Ω·cm) | 18.9 | | 22.3 | 49.6 |
| $T_{liq}$ (° C.) | | | 1320-1330 | |
| Viscosity at $T_{liq}$ (Pa·s) | | | 1150-1330 | |
| $CTE_{(20-300°\ C.)}$ (× $10^{-7}$/° C.) | 22.3 | | 23.8 | 22.4 |
| Resistance to acid attack (1/2 weight loss − mg/dm$^2$) | | | | 38.5 |
| Y (%) (4 mm thick) | 5.6 | 5.1 | 2.6 | 3.3 |

TABLE ID

| Composition (weight %) | Example 13 | Example 14 | Example 15 | Example 16 |
|---|---|---|---|---|
| $SiO_2$ | 64.062 | 64.255 | 64.582 | 64.347 |

TABLE ID-continued

| Composition (weight %) | Example 13 | Example 14 | Example 15 | Example 16 |
|---|---|---|---|---|
| $Al_2O_3$ | 15.74 | 15.69 | 15.73 | 15.69 |
| $B_2O_3$ | 5.90 | 5.87 | 5.89 | 5.87 |
| MgO | 1.67 | 1.36 | 1.36 | 1.36 |
| ZnO | 5.91 | 5.88 | 5.89 | 5.88 |
| $SnO_2$ | 0.20 | 0.20 | 0.20 | 0.20 |
| BaO | 1.89 | 2.56 | 2.57 | 2.56 |
| $Li_2O$ | | | | |
| $Na_2O$ | 1.01 | 1.01 | 1.01 | 1.01 |
| CaO | 0.13 | | | 0.13 |
| $P_2O_5$ | 1.06 | 1.05 | 0.63 | 0.63 |
| CuO | 1.77 | 1.47 | 1.48 | 1.47 |
| $Fe_2O_3$ | 0.204 | 0.204 | 0.204 | 0.402 |
| CoO | | | | |
| NiO | | | | |
| $Cr_2O_3$ | 0.452 | 0.450 | 0.451 | 0.450 |
| MgO + BaO + CaO + SrO | 3.7 | 3.9 | 3.9 | 4.1 |
| $Li_2O$ + $Na_2O$ + $K_2O$ | 1.0 | 1.0 | 1.0 | 1.0 |
| $B_2O_3$ + MgO + $Li_2O$ − (BaO + CaO + SrO + CuO) | 3.8 | 3.2 | 3.2 | 3.1 |
| Properties | | | | |
| $T_{(30\,Pa\cdot s)}$ (° C.) | 1654 | | | 1656 |
| Resistivity at 30 Pa · s ($\Omega \cdot$ cm) | 31.3 | | | 52 |
| $T_{liq}$ (° C.) | | | | |
| Viscosity at $T_{liq}$ (Pa · s) | | | | |
| $CTE_{(20-300°\,C.)}$ ($\times 10^{-7}$/° C.) | 22.8 | 22.9 | | 23.9 |
| Resistance to acid attack (1/2 weight loss − mg/dm$^2$) | 27.5 | | | 28.5 |
| Y (%) (4 mm thick) | 3.6 | 5.0 | 5.0 | 2.7 |

TABLE II

| Composition (weight %) | Exemple A | Exemple B | Exemple C |
|---|---|---|---|
| $SiO_2$ | 66.186 | 67.059 | 63.087 |
| $Al_2O_3$ | 16.00 | 16.09 | 15.44 |
| $B_2O_3$ | 6.00 | 6.03 | 5.78 |
| MgO | 2.50 | 2.01 | 1.64 |
| ZnO | 6.00 | 6.04 | 5.79 |
| $SnO_2$ | 0.30 | 0.30 | 0.29 |
| BaO | 3.00 | 1.35 | 1.85 |
| $Li_2O$ | | 0.50 | 0.48 |
| $P_2O_5$ | | | 2.07 |
| CuO | | 0.60 | 3.55 |
| $Fe_2O_3$ | 0.014 | 0.015 | 0.018 |
| MgO + BaO + CaO + SrO | 5.5 | 3.4 | 3.5 |
| $Li_2O$ + $Na_2O$ + $K_2O$ | 0.0 | 0.5 | 0.5 |
| $B_2O_3$ + MgO + $Li_2O$ − (BaO + CaO + SrO + CuO) | 5.5 | 6.6 | 2.5 |
| Properties | | | |
| $T_{(30\,Pa\cdot s)}$ (° C.) | 1709 | 1670 | 1646 |
| Resistivity at 30 Pa · s ($\Omega \cdot$ cm) | 106 | 27.4 | 19.2 |
| $T_{liq}$ (° C.) | 1350-1400 | 1360-1380 | |
| Viscosity at $T_{liq}$ (Pa · s) | 900-1800 | 760-1020 | |
| $CTE_{(20-300°\,C.)}$ ($\times 10^{-7}$/° C.) | 23.4 | 23.3 | 22.3 |
| Resistance to acid attack (1/2 weight loss − mg/dm$^2$) | 81.7 | 395 | |
| Y (%) (4 mm thick) | | | 23.10 |

Comments

All glass specimens of the present application (of Examples 1 to 16) present:

viscosity of 30 Pa·s (300 poises) at less than 1680° C.;
viscosity at the liquidus temperature of more than 500 Pa·s (5000 poises);
electrical resistivity at 30 Pa·s of less than 100 Ω·cm:
a coefficient of thermal expansion (CTE) from 20° C. to 300° C., less than $30 \times 10^{-7}$/° C.; and
resistance to acid attack (half weight loss per unit area), measured in accordance with the DIN 12-116 standard, less than 250 mg/dm$^2$.

The effect of the CuO content in the composition on the high temperature viscosity of the glass is shown in Table III below and also in accompanying FIG. 1.

TABLE III

| | Example A | Example B | Example 1 | Example 3 |
|---|---|---|---|---|
| CuO content (weight %) | 0.00 | 0.60 | 1.21 | 1.81 |
| Melting agent oxides content (weight %) | 5.5 | 4.5 | 4.8 | 5.4 |
| $SiO_2$ content (weight %) | 66.6 | 67.0 | 66.9 | 66.3 |
| $T_{(30\,Pa\cdot s)}$ (° C.) | 1687 | 1670 | 1661 | 1651 |

At similar contents in the composition of $SiO_2$ and of melting agent oxides (BaO+MgO+CaO+$Li_2O$+$Na_2O$+CuO+$K_2O$), increasing the content of CuO in said composition leads to a reduction in the temperature at which the molten mixture presents viscosity of 30 Pa·s (300 poises). In other words, the presence of CuO within the composition is particularly effective in lowering the melting temperature of the bath; it is thus particularly advantageous in terms of energy consumption and tool wear (the lifetime of the melting furnace can thus be lengthened).

As coloring agents, the glass in Examples 1 to 8 contains CuO (essentially added to lower the viscosity of the glass (without degrading its CTE)) and $Fe_2O_3$ (present as impurity (brought in with the raw materials)). There was little coloring (see the Y values given for the glass in Examples 7 and 8).

Glass presenting a dark black color was obtained by including in the composition in addition to CuO (and $Fe_2O_3$ present as impurity) coloring agents (selected from NiO, CoO, $Cr_2O_3$, $Fe_2O_3$, and mixtures thereof). The glass present transmission values integrated in the visible Y % less than 6% for thicknesses of 4 mm (Examples 9 to 16). Thus, for applications to induction heating with infrared sensors, it is entirely possible to produce cooktops "similar" to the cooktops described in patent application WO 2012/156444, by varying the natures and the contents of the coloring agents present.

It may also be observed that the spectral transmission curves (T %) that were obtained in the visible are practically flat (see FIG. 2, relating to Example 11). A glass of the present application is thus compatible with LEDs at a plurality of wavelengths. This can be very advantageous, from an appearance point of view, when it is desired to arrange lighting at a plurality of wavelengths under the glass cooktops.

The comparative Examples A to C (Table II) relate respectively to:

a glass of composition containing no alkali, and no CuO (Example A). Said glass had $T_{(30Pa\cdot s)}$ and resistivity that are too high;
a glass of a composition in which the value of $B_2O_3$+MgO+$Li_2O$—(BaO+CaO+SrO+CuO) was excessive (6.6%>6.4%) (Example B). That had a negative effect on the resistance to acid attack of said glass (395 mg/dm²>250 mg/dm²); and a glass of composition containing too great a content of CuO (3.55%>3%) (comparative Example C). Copper crystals were observed to precipitate at the surface (FIGS. 3 and 4).

The invention claimed is:

1. An aluminoborosilicate glass of composition, expressed as percentages by weight of oxides, containing:
   60% to 70% of $SiO_2$,
   13% to 20% of $Al_2O_3$,
   1% to 9% of $B_2O_3$,
   0 to 3% of $P_2O_5$,
   0.5% to 4% of MgO,
   1% to 4% of BaO,
   0 to 3% of CaO,
   0 to 3% of SrO,
   2% to 10% of ZnO,
   0 to 2% of $Li_2O$,
   0 to 2% of $Na_2O$,
   0 to 2% of $K_2O$,
   0.1% to 3% of CuO,
   0 to 1% of at least one fining agent;
   and
   0 to 2% of at least one coloring agent other than CuO, with:

MgO+BaO+CaO+SrO≤6%, 0.2%≤$Li_2O$+$Na_2O$+$K_2O$≤2%, and $B_2O_3$+MgO+$Li_2O$—(BaO+CaO+SrO+CuO)<6.4%.

2. An aluminoborosilicate glass according to claim 1, wherein the composition contains 0 to 1% of $Li_2O$.

3. An aluminoborosilicate glass according to claim 1, wherein the composition does not contain SrO, with the exception of inevitable traces.

4. An aluminoborosilicate glass according to claim 1, wherein the composition contains 0.5% to 1.8% of CuO.

5. An aluminoborosilicate glass according to claim 1, wherein the composition contains at least one coloring agent other than CuO.

6. An aluminoborosilicate glass according to claim 5, wherein said at least one coloring agent is selected from $Fe_2O_3$, CoO, NiO, $Cr_2O_3$, $MnO_2$, and $V_2O_5$, and mixtures thereof.

7. An aluminoborosilicate glass according to claim 1, wherein it presents:
   viscosity of 30 Pa·s (300 poises) at less than 1680° C.;
   viscosity at the liquidus temperature of more than 500 Pa·s (5000 poises);
   electrical resistivity at 30 Pa·s of less than 100 Ω·cm;
   coefficient of thermal expansion (CTE) from 20° C. to 300° C. less than $30\times10^{-7}$/° C.; and
   resistance to acid attack (half weight loss per unit area), measured using the DIN 12-116 standard of less than 250 mg/dm².

8. An article constituted at least in part of an aluminoborosilicate glass according to claim 1, the article being selected in particular from glazing and from a cooktop for associating with induction heater means with infrared sensors.

9. An aluminoborosilicate glass according to claim 1, wherein the composition contains $B_2O_3$+MgO+$Li_2O$—(BaO+CaO+SrO+CuO)<6%.

10. An aluminoborosilicate glass according to claim 1, wherein the composition contains 0.1% to 1% of $Li_2O$.

11. An aluminoborosilicate glass according to claim 1, wherein the composition contains 0.2% to 0.6% of $Li_2O$.

12. An aluminoborosilicate glass according to claim 1, wherein the composition contains 0.001% to 2% of at least one coloring agent other than CuO.

13. An aluminoborosilicate glass according to claim 1, wherein the composition contains 0.05% to 2% of at least one coloring agent other than CuO.

14. An aluminoborosilicate glass according to claim 5, wherein the at least one coloring agent is selected from a mixture of NiO, CoO, and $Fe_2O_3$.

15. An aluminoborosilicate glass according to claim 1, wherein it presents a viscosity of 30 Pa·s (300 poises) at less than 1660° C.

16. An aluminoborosilicate glass according to claim 1, wherein it presents a viscosity at the liquidus temperature of more than 600 Pa·s (6000 poises).

* * * * *